United States Patent [19]
Coons

[11] 3,708,198
[45] Jan. 2, 1973

[54] CONVERTIBLE TRAILER, PORCH AND CAMPER

[76] Inventor: Glen T. Coons, Mansker Creek Trail Park, 2440 North Gallitin Road, Nashville, Tenn. 37206

[22] Filed: Jan. 29, 1971

[21] Appl. No.: 111,001

[52] U.S. Cl. .............................. 296/23 R, 280/163
[51] Int. Cl. ............................................... B60g 3/32
[58] Field of Search......296/23 R, 3, 10, 11; 280/163

[56]  References Cited

UNITED STATES PATENTS

| | | | |
|---|---|---|---|
| 2,729,196 | 1/1956 | Breitenbach | 296/3 |
| 2,362,567 | 11/1944 | La Rue | 296/23 R |
| 2,929,654 | 3/1960 | Jones | 296/23 R |
| 2,961,577 | 2/1949 | Starr | 296/10 |

*Primary Examiner*—Philip Goodman
*Attorney*—Harrington A. Lackey

[57] ABSTRACT

A wheeled platform having vertically adjustable leveling standards at each corner for supporting the platform in stationary, level position, spaced columns projecting upward from the edges of the platform; top rails removably supported upon the top ends of the columns; and a detachable step assembly to permit the platform to function as a portable porch for a mobile home or trailer. Side rails removably and adjustably supported upon the columns beneath the top rails in vertically spaced relationship also provide containing walls, to permit the platform to function as a utility trailer with the leveling standards raised and the step assembly removed. Some of the columns on both sides of the platform are provided with upper tubular sockets to receive the depending legs of a canopy frame for supporting a canopy above the platform to function as a camp in a vehicle.

10 Claims, 8 Drawing Figures

PATENTED JAN 2 1973

GLEN T. COONS
INVENTOR

BY Harrington A. Lackey
ATTORNEY

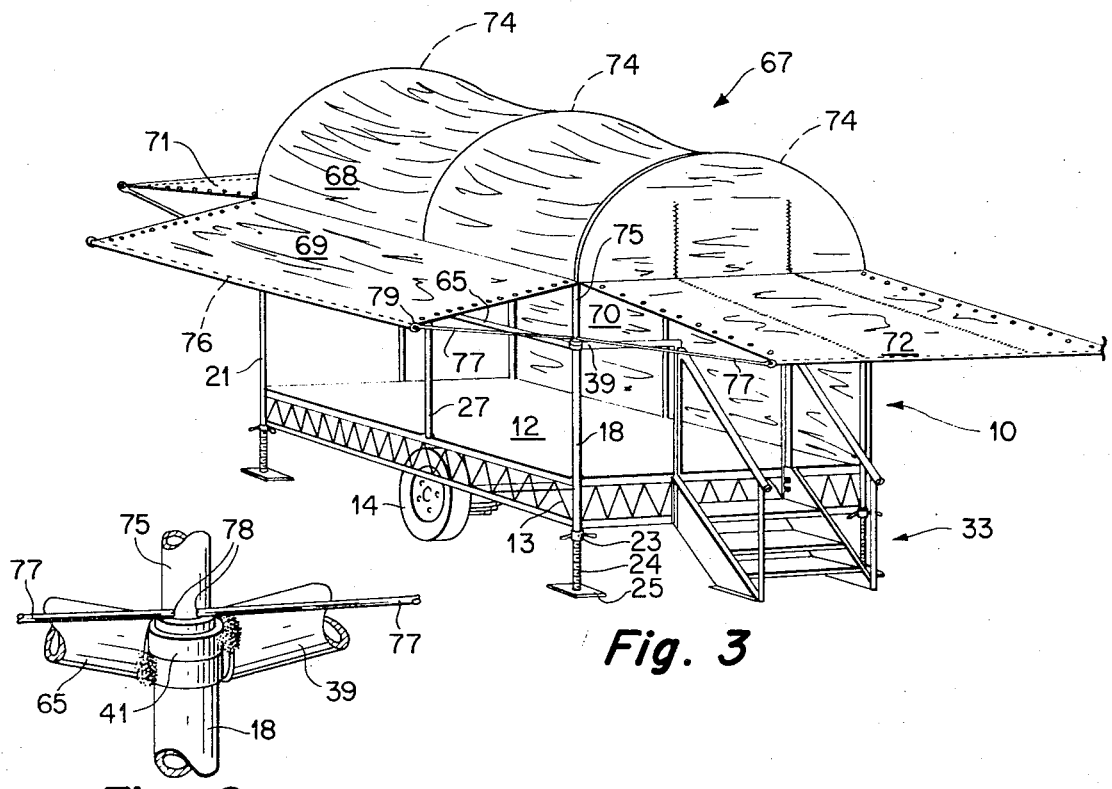
Fig. 3
Fig. 8
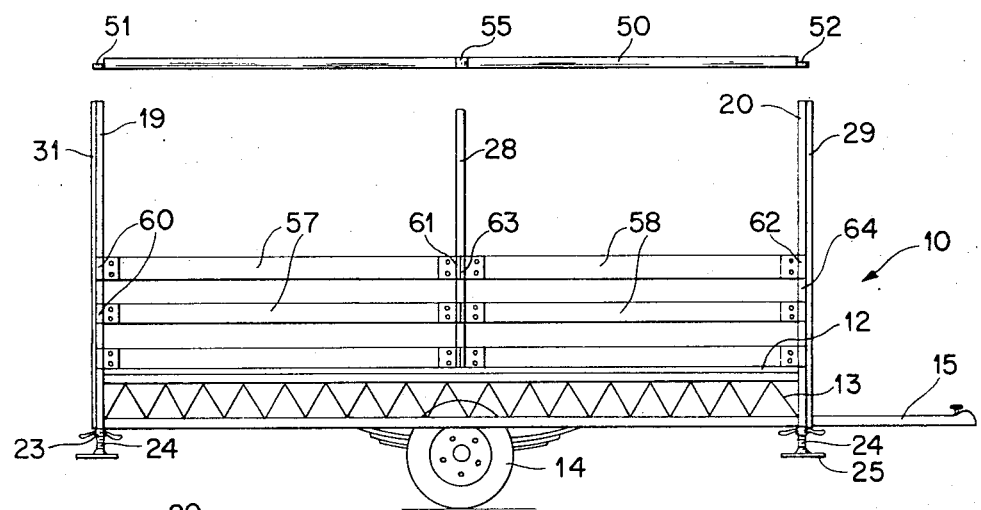
Fig. 2
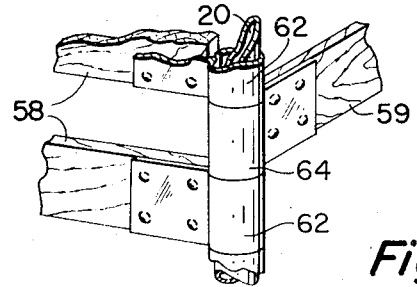
Fig. 7

CONVERTIBLE TRAILER, PORCH AND CAMPER

BACKGROUND OF THE INVENTION

This invention relates to a convertible trailer vehicle, and more particularly to a trailer vehicle construction adapted to function as a utility trailer, a porch for a mobile home, or a camper.

Trailer vehicles of various types, mobile home porches, and trailer campers are well-known in the art. Furthermore, mobile home porches which are adapted to be readily assembled and disassembled are known. Campers which are collapsible, expandable, adjustable and which have detachable parts are also known in the art. However, it is not believed that there is a known construction of a trailer vehicle which is adapted to be converted from a utility trailer into a porch for a mobile home or a camper, with a minimum of effort and accessory parts.

SUMMARY OF THE INVENTION

It is therefore an object of this invention to provide a unique construction in a convertible trailer vehicle which serves the three functions of a utility trailer, mobile home porch or trailer.

The convertible vehicle made in accordance with this invention includes a platform supported by wheels and provided with a draft mechanism for attachment to a draft vehicle for towing. The vehicle is also provided with a plurality of upright columns fitted to the edges of the platform and supported in spaced apart relationship around the periphery of the platform. Top rails are adapted to be removably secured to the top ends of at least some of the columns. Leveling standards are coaxially mounted below the top corner columns and adapted to be lowered to engage the ground and support the platform in a substantially horizontal, stationary position. A step assembly is provided for detachable mounting to one end of the platform to provide access to the platform when in its stationary position, either as a porch or as a camper.

The shelter for the camper is provided by a canopy frame having depending legs adapted to be received in tubular sockets comprising the upper hollow ends of some of the columns on both sides of the platform. The canopy on the canopy frame may have side and end walls or flaps, adapted to be swung and supported in laterally distended positions by supporting struts.

When the vehicle functions as a utility trailer, the step assembly and canopy frame are removed, a plurality of side rails or slats, having means for slidably receiving the ends of the slats over the columns, are mounted on the columns with the top rails removed. The top rails are then re-assembled, the leveling standards elevated, the draft mechanism connected to the draft vehicle. The load supported upon the platform is contained by the surrounding side rails or slats, and the vehicle is ready for travel.

BRIEF DESCRIPTION OF THE DRAWING

FIG. 2 is a side elevation of the vehicle functioning as a utility trailer, with some of the side rails in place and with the top rails removed;

FIG. 3 is a perspective view of the vehicle functioning as a camper, with the front, rear and near-side flaps raised, and the far-side flap lowered;

FIG. 7 is an enlarged, fragmentary perspective view of a pair of side rails and an end rail connected to a common corner column; and FIG. 8 is an enlarged fragmentary perspective view of a canopy frame leg supported in a corner column, and also of the connection of the struts for an end flap and a side flap.

DESCRIPTION OF THE PREFERRED EMBODIMENT

Figure 1:
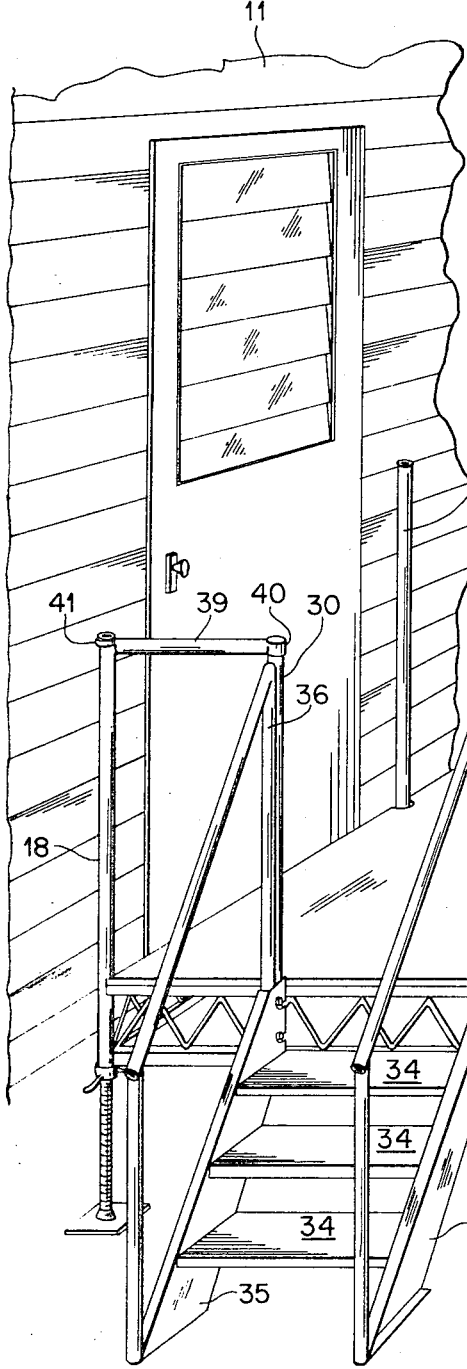
FIG. 1 is a perspective view of the vehicle in operative position as a porch for a mobile home, which is partially disclosed.

Referring now to the drawings in more detail, FIG. 1 discloses the trailer vehicle 10 functioning as a porch for a mobile home 11. The vehicle 10 includes a rectangular platform 12 of any desired construction having a supporting, reinforced frame 13 and supported by ground-engaging wheels 14. Fixed to the front end of the platform frame 13 is a draft tongue 15 of any convenient construction and adapted to be connected to a trailer hitch mounted on the rear end of a draft vehicle, such as an automobile or truck, not shown.

Figure 5:
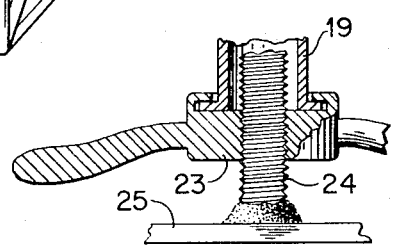
FIG. 5 is an enlarged fragmentary sectional elevation of a leveling standard in raised position.

Fixed to each corner of the platform 12, to project upward a substantially uniform height above the level of the platform 12, are corner columns 18, 19, 20 and 21. As disclosed in the drawings, the corner columns 18, 19, 20, and 21 are preferably tubular, and may be uniform lengths of pipe. As best disclosed in FIGS. 1 and 5, the bottom end of each corner column, such as column 19, is provided with a freely rotatable axial collar 23. The collar 23 is internally threaded to operatively received the externally threaded leveling standard 24, to the bottom of which is fixed a ground-engaging foot 25. The threaded standard 24 projects up through the hollow corner column 19, where its major length is housed when the standard 24 is in elevated traveling position, as disclosed in FIGS. 2 and 5.

The opposite side edges of the platform 12 may also be provided with one or more upstanding side columns 27 and 28 respectively. A front end column 29 may also be fixed to the front edge of the platform 12 between the front corner columns 20 and 21.

Figure 6:
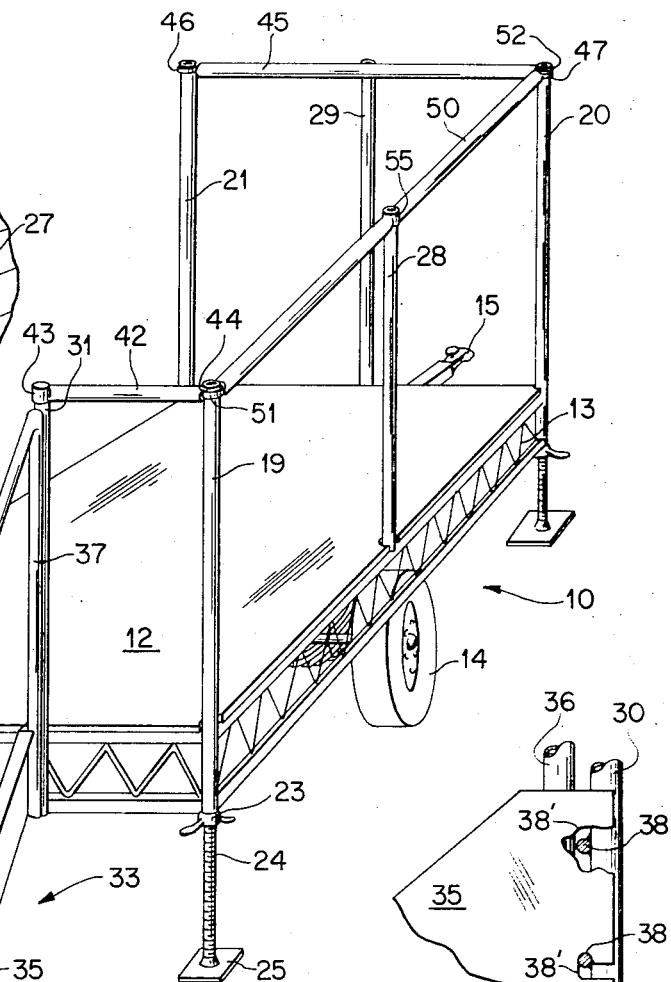
FIG. 6 is an enlarged fragmentary elevation of the connection between the step assembly and one of the rear columns.

However, fixed to the rear edge of the platform frame 13 are a pair of upstanding rear gate columns 30 and 31 spaced apart to provide a passageway. A step assembly 33 may be pre-fabricated, including steps 34 fixed within the assembly frame 35 and a pair of upper handrail posts 36 and 37, respectively. The posts 36 and 37 are substantially the same length as, and spaced apart substantially the same distance as the gate columns 30 and 31, so that the posts 36 and 37 may be positioned closely adjacent each of the corresponding gate columns 30 and 31. As best disclosed in FIGS. 1 and 6, a pair of pins 38 project laterally inward from each column 30 and 31, and in operative position are engaged by the hook slots 39 formed in the upper edges of the step frame 35. In this manner, the step assembly 33 may be easily assembled and disassembled in operative position to permit ready access to the platform 12, when functioning as a porch, so that a person may walk up the steps 34 and pass through the passageway provided between the gate columns 30 and 31.

When the vehicle 10 is functioning as a porch, as disclosed in FIG. 1, a short top rail 39 connects the top ends of the corner column 18 and the gate column 30. The particular construction of the top rail 39 includes at one end, a cylindrical cap 40 adapted to fit over the top end of the gate column 30. The other end of the short top rail 39 comprises a loop, ring or short collar 41 adapted to slip over the top end of the corner column 18. The collar 41 may be secured in position by a set screw, not shown.

In a similar manner, another short top rail 42, identical in construction to the top rail 39, is secured to the top ends of the corner column 19 and the gate column 31. One end of the top rail 42 is provided with a cylindrical cap 43, identical to the cap 42 to fit over the top end of the gate column 31. The other end of the top rail 42 is provided with a collar or ring 44, identical to collar 41, adapted to fit over the top end of the corner column 19.

A front top rail 45 is provided at each end with a ring collar 46 and 47 adapted to slip-fit over the top ends of the corner columns 21 and 20, respectively. Set screws, such as 48 may be provided for holding the collars 46 and 47 in fixed positions. As best disclosed in FIGS. 1 and 2, the front column 29 is mounted upon the platform frame 13 to project upwardly in front of the front top rail 45 in order not to interfere with the positioning of the front top rail 45.

A side top rail 50 is provided with collars 51 and 52 at its opposite ends for slidably fitting over the top ends of the corner columns 19 and 20, respectively. The collars 51 and 52 may also be provided with set screws, such as set screw 53, to fix the collars 51 and 52 upon their respective corner columns.

Figure 4:
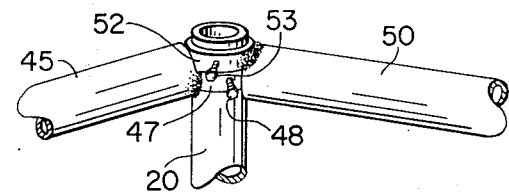
FIG. 4 is a fragmentary, enlarged perspective view of the connection of a pair of adjacent top rails to a corner column.

In order that the top rails 42, 50 and 49 can be mounted in a substantially horizontal plane, the corresponding overlapping collars, such as 47 and 52, are off-set from the longitudinal axis of each top rail 45 and 50, respectively, as best disclosed in FIG. 4.

Since the side column 28 is in the same plane as the corner columns 19 and 20, the middle portion of the side top rail 50 is provided with an integral collar or sleeve 55 to fit over the top end of the intermediate column 28.

Although a side top rail identical in construction to the top rail 50 may be provided for fitting over the top ends of the aligned columns 18, 27, and 21, nevertheless such a top rail is removed, as shown in FIG. 1, where the vehicle 10 is functioning as a porch to a mobile home 11. In this case, the mobile home 11 itself forms one side wall of the vehicle 10.

As disclosed in FIG. 2, the step assembly 33 has been removed, and the leveling standards 24 elevated so that only the wheels 14 support the platform frame 13 in position for travel.

However, before the vehicle 10 is ready for travel as a utility trailer, all of the top rails 39, 42, 50 and 45 are removed, by loosening the respective set screws, such as 48 and 53, from the top ends of the corresponding columns, as indicated by the raised side top rail 50 in FIG. 2. With the top rails removed, a plurality of side rails or slats, such as 57, 58 and 59 are connected to the various columns in order to provide an enclosure completely around the platform 12. Each side rail or slat 57 is uniformly constructed. A tubular sleeve 60 is fixed at one end of the rail 57 to slide over the corner column 19. The opposite end of each rail 57 is provided with a half-sleeve 61 adapted to be slidably received against the opposing half of the intermediate column 28.

The side rails 58 are also uniform and constructed identically to the side rails 57, except they are reversed end-for-end with the side rails 57, so that their cylindrical sleeves 62 are adapted to slidably fit over the corner column 20, while the semi-cylindrical sleeves 63 are adapted to slidably engage the opposite half of the intermediate column 28. Thus, a pair of sleeves 61 and 63 opposing each other form a full cylindrical collar or sleeve fitting around the intermediate column 28.

Another set of slats 59 (FIG. 7) extend across the front and rear ends of the vehicle 10. Each slat 59 is provided at each end with an identical cylindrical collar 64 adapted to fit over respective pairs of columns 20 − 21 and 18 − 19. As disclosed in FIG. 7, the side rails 57 and 58 are alternately vertically positioned with the end slats 59, so that the collars, such as 62 and 64, fit over a common column, such as 20, in stacked abutting relationship. In other words, the side and end rails 57, 58, and 59 are supported in the same manner as the logs in a typical log cabin.

Although the side rails 57 and 58 are only disclosed to extend about half the height of columns 19, 28 and 20 in FIG. 2, nevertheless the rails 57, 58 and 59 may be stacked to the full height of the respective columns. The top rails 39, 42, 50 and 45 are then replaced in their positions disclosed in FIG. 1.

The vehicle 10 is then fully assembled as a utility trailer, and is ready for travel when the tongue 15 is connected to an appropriate draft vehicle.

FIG. 3 discloses a vehicle 10 in operative position as a camper. The parts of the vehicle 10 are identical to those disclosed in FIG.1 when the vehicle 10 is functioning as a porch, except that a side top rail 65, identical in construction to the side top rail 50 is mounted in position over the top ends of the columns 18, 27 and 21.

Since all of the columns, and particularly the side columns 18, 27 and 21 and 19, 28 and 20, are of tubular type material, their upper ends remain open, even when supporting the respective top rails 65, 50, 39, 42 and 45, by virtue of the respective open tubular collar fittings.

The camper comprises a canopy 67 including an arched roof portion 68, side flaps 69 and 70, front flap 71, and rear flap 72. The canopy 67 is mounted over a canopy frame including bows 74 having depending vertical legs 75, preferably tubular and being of a smaller diameter to slip-fit within the upper ends of the respective columns, such as column 18 disclosed in FIG. 8. As disclosed in FIG. 3, the canopy frame includes front, rear and intermediate bows 74, the depending legs 75 of which are adapted to fit within the respective corner columns 18, 19, 21 and 20, as well as the intermediate columns 27 and 28.

All the flaps 69, 70, 71 and 72, hang freely to cover the entire space above the platform 12 to form a complete shelter. Within the bottom edge of each flap, such as 69, is a rigid rod 76, the ends of which project slightly beyond the side edges of the flap 69. Struts 77 support each flap, such as 69, in a laterally projecting position by having an inner end projecting through an aperture 78 within the depending leg 75 above the top end of a column such as 18 (FIG. 8). The opposite end of each strut 77 is provided with a loop or journal 79 for receiving the projecting ends of the rods 76.

As disclosed in FIG. 3, three of the flaps 69, 71 and 72 are supported in their laterally projected positions by the struts 77, as described above.

By removing the struts 77 and lifting the bows 74, the depending legs 75 may be removed from the respective columns, and the remaining structure of the vehicle 10 will be the same as that disclosed in FIG. 1, with the exception of the addition of the side top rail 65.

The vehicle 10 may then be converted into a utility trailer as disclosed in FIG. 2, by carrying out the same steps previously described in converting the porch to a utility trailer.

It will also be understood that whether the vehicle 10 is employed as a camper as disclosed in FIG. 3 or a porch as disclosed in FIG. 1, that the accessories, such as the steps 33, the bows 74, and canopy 67, when disassembled, may be carried by the vehicle 10 when functioning as a utility trailer as disclosed in FIG. 2.

What is claimed is:

1. A convertible trailer vehicle comprising:
   a. a platform having front, rear and side edges,
   b. wheel means supporting said platform for rolling movement,
   c. draft means fixed to the front of said platform,
   d. a plurality of columns fixed to said edges to project upward from said platform, said columns being spaced around the periphery of said platform,
   e. two of said columns being spaced apart on said rear edge to form a passageway there-between,
   f. step means adapted to be detachably connected to said two rear columns to provide steps from the ground upon which said wheel means rest, to said rear passageway,
   g. a plurality of rails,
   h. means for detachably securing said rails to said columns along any, or all, of said edges,
   i. a plurality of leveling standards, each of which is adjustably secured to the bottom of said platform for vertical adjustment between a lower ground-supporting position and an elevated travelling position.

2. The invention according to claim 1 in which said rails comprise top rails and side rails, said means for detachably securing said side rails to said columns comprising loop means slidably and removably receiving said columns for vertical adjustment said means for detachably securing said top rails to said columns comprising fittings adapted to be detachably secured to the top ends of said columns.

3. The invention according to claim 1 in which said columns comprise a corner column fixed to each corner of said platform, the bottom end of each corner column being internally threaded, an externally threaded leveling rod for each corner column threadedly engaging the internally threaded end of said corner column for vertical coaxial adjustment.

4. The invention according to claim 1 in which said step means have a pair of upper spaced apart posts adapted to be placed adjacent said two rear columns in operative position, pins on one of said pair of rear columns or posts, and hook means on the other of said pair of columns or posts for detachable engagement with said pins to hold said step means in operative position.

5. The invention according to claim 2 in which said loop means comprise uniform collars fixed to the ends of said side rails, so that the collars of adjacent ends of said side rails may be fitted over a common column, said collars abutting each other vertically upon said columns to hold said side rails in vertically spaced relationship.

6. The invention according to claim 1 in which at least two columns fixed upon each side edge of said platform comprises an upper tubular socket, a canopy frame having depending legs on at least two opposite sides of said canopy frame, said legs being spaced apart to correspond to the spacing between said columns having upper tubular sockets, so that said legs may be inserted and received in corresponding tubular sockets to support said canopy frame above said platform 7. The invention according to claim 6 further comprising a canopy supported upon said canopy frame, said canopy having a roof portion, front and rear flaps and opposite side flaps, so that said roof portion and all said flaps are adapted to enclose the space above said platform, in operative position.

8. The invention according to claim 7 in which said end and side flaps are adapted to swing outward relative to said roof portion, struts connected to the lower ends of said flaps, and means on said depending canopy frame legs for receiving the opposite ends of said struts to hold said flaps in lateral projected positions.

9. The invention according to claim 8 in which said strut receiving means comprise apertures in said frame legs, said struts in operative position extending into a corresponding aperture and resting upon the corresponding tubular socket of said column to limit the descent of said legs into said sockets.

10. The invention according to claim 2 in which said fittings for the adjacent ends of said top rails comprise vertically offset collars of uniform size so that when said adjacent collars fit on top of each other on a common column, said top rails are maintained in a substantially horizontal plane, and means for securing said collars in fixed position upon said columns.

* * * * *